US007822762B2

(12) United States Patent
Payne et al.

(10) Patent No.: US 7,822,762 B2
(45) Date of Patent: *Oct. 26, 2010

(54) ENTITY-SPECIFIC SEARCH MODEL

(75) Inventors: Christopher D. Payne, Seattle, WA (US); Eric J. Horvitz, Kirkland, WA (US); Alexander G. Gounares, Kirkland, WA (US); Susan T. Dumais, Kirkland, WA (US); Kyle G. Peltonen, Issaquah, WA (US); Gary W. Flake, Bellevue, WA (US); Xuedong D. Huang, Bellevue, WA (US); William H. Gates, III, Medina, WA (US); John C. Platt, Redmond, WA (US); Oliver Hurst-Hiller, New York, NY (US); Joshua T. Goodman, Redmond, WA (US); Christopher A. Meek, Kirkland, WA (US); Ramez Naam, Seattle, WA (US); Raymond E Ozzie, Manchester, MA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 72 days.

This patent is subject to a terminal disclaimer.

(21) Appl. No.: 11/427,311

(22) Filed: Jun. 28, 2006

(65) Prior Publication Data
US 2008/0005076 A1    Jan. 3, 2008

(51) Int. Cl.
*G06F 7/001* (2006.01)
(52) U.S. Cl. .................................. 707/765; 707/748
(58) Field of Classification Search ................ 707/4, 707/2, 765, 748
See application file for complete search history.

(56) References Cited

U.S. PATENT DOCUMENTS

| 5,493,692 A | 2/1996 | Theimer et al. |
| 5,544,321 A | 8/1996 | Theimer et al. |
| 5,555,376 A | 9/1996 | Theimer et al. |

(Continued)

FOREIGN PATENT DOCUMENTS

WO          9800787          1/1998

OTHER PUBLICATIONS

Merriam-Webster dictionary defines "objective" as "characteristic".*

(Continued)

*Primary Examiner*—Mohammad Ali
*Assistant Examiner*—Donald Lawson
(74) *Attorney, Agent, or Firm*—Hope Baldauff Hartman, LLC

(57) ABSTRACT

A system that employs an explicitly and/or implicitly trained model in order to return entity-specific computer-based search results is provided. The innovation can provide for a customized search model that focuses search in connection with achieving information that is meaningful with respect to goals of an entity. The model can be used to modify a search query in accordance with a goal of the entity or to generate the search query thereby returning meaningful and/or targeted results to the user. The system can automatically gather entity-related data thereafter determining or inferring a goal as well as training the model. Moreover, the system can selectively configure (e.g., order, rank, filter) and render results to a user based upon the model.

16 Claims, 10 Drawing Sheets

U.S. PATENT DOCUMENTS

| | | | |
|---|---|---|---|
| 5,603,054 | A | 2/1997 | Theimer et al. |
| 5,611,050 | A | 3/1997 | Theimer et al. |
| 5,812,865 | A | 9/1998 | Theimer et al. |
| 6,185,558 | B1 | 2/2001 | Bowman et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,968,333 | B2 | 11/2005 | Abbott et al. |
| 7,107,263 | B2 | 9/2006 | Yianilos et al. |
| 7,181,438 | B1* | 2/2007 | Szabo ............... 707/2 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0169658 | A1 | 11/2002 | Adler |
| 2003/0046401 | A1 | 3/2003 | Abbott et al. |
| 2003/0154476 | A1 | 8/2003 | Abbott, III et al. |
| 2004/0193894 | A1* | 9/2004 | Chaudhari et al. ........ 713/186 |
| 2005/0034078 | A1 | 2/2005 | Abbott et al. |
| 2007/0174259 | A1 | 7/2007 | Amjadi |
| 2008/0040314 | A1* | 2/2008 | Brave et al. ............... 707/2 |

OTHER PUBLICATIONS

Merriam-Webster dictionary defines "centric" as "central".*
Reiner Kraft, Farzin Maghoul, Chi Chao Chang, Ravi Kumar, Searching with context, ACM, May 23-26, 2006, pp. 477-486.*
V. M. Driyanskii, T. N. Komarova, Probability—statistical model of information retrieval in descriptor systems, google.com, 1982, pp. 835-840.*
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 28, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
OA dated Jul. 22, 2008 for U.S. Appl. No. 11/426,994, 38 pages.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, in The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
U.S. Official Action dated May 1, 2008 in U.S. Appl. No. 10/758,359.
U.S. Official Action dated Dec. 31, 2008 in U.S. Appl. No. 11/426,994.
U.S. Official Action dated Sep. 21, 2009 in U.S. Appl. No. 11/426,994.
U.S. Official Action dated Mar. 1, 2010 in U.S. Appl. No. 11/426,994.

* cited by examiner

ENTITY-SPECIFIC SEARCH MODEL

CROSS-REFERENCE TO RELATED APPLICATIONS

This application is related to pending U.S. patent application Ser. No. 11/426,994 filed Jun. 28, 2006, entitled "ENTITY-SPECIFIC SEARCH MODEL." The entirety of the above-noted application is incorporated by reference herein.

BACKGROUND

Search engine agents, often referred to as spiders or crawlers, navigate websites in a methodical manner and retrieve information about sites visited. For example, a crawler can make a copy of all or a portion of websites and related information. The search engine then analyzes the content captured by one or more crawlers to determine how a page will be indexed. Some engines will index all words on a website while others may only index terms associated with particular tags such as for example: title, header or metatag(s). Crawlers must also periodically revisit webpages to detect and capture changes thereto since the last indexing.

Once indexes are generated, they typically are assigned a ranking with respect to certain keywords, and stored in a database. A proprietary algorithm is often employed to evaluate the index for relevancy, for example, based on frequency and location of words on a webpage, among other things. A distinctive factor in performance amongst conventional search engines is the ranking algorithm respectively employed.

Upon entry of one or more keywords as a search query, the search engine retrieves indexed information that matches the query from the database, generates a snippet of text associated with each of the matching sites and displays the results to a user. The user can thereafter scroll through a plurality of returned sites in connection with determining if the sites are related to interests of the user. However, this can be an extremely time-consuming and frustrating process as search engines often return a substantial number of sites. More often then not, the user is forced to further narrow the search iteratively by altering and/or adding keywords and Boolean operators to converge on websites that provide the sought after information.

SUMMARY

The innovation disclosed and claimed herein relates to a system that employs an explicitly and/or implicitly trained model to provide entity-specific computer-based search results. A customized search model focuses a search in connection with achieving information that is meaningful with respect to goals of an entity (e.g., a single or group of individuals or computers, whether formally or informally organized). As used herein, a "goal" refers to substantially any mission, objective, task, project, purpose, preference, forecast, desire, etc. of an "entity."

In one aspect, the model can be employed to modify a search query in accordance with goal(s) of the entity. For example, a user can input a search query that can be modified in accordance with the model to return targeted and/or meaningful results in accordance with inferred or determined goal(s) of the entity. In another aspect, the model can be used to generate the search query thereby returning meaningful and/or targeted results to the user. The modifications can be executed in a manner transparent or visible to the user.

Additionally, the system can access entity-related data sources in order to determine an entity goal and/or train a data model. In disparate embodiments, particular source(s) of information can be weighted more heavily than other source(s) in connection with generation of the model and/or by the model. In accordance with the model, content can be filtered to facilitate converging upon a goal of the entity. Moreover, content can be ranked and/or ordered in accordance with the goal(s).

The model can be applied to substantially any cluster of individuals or entities where customized classification, content provisioning, filtering, etc. is desired whether as part of an entity goal and/or preference among a set of like individuals or entities. In still other aspects, the model can be applied to distributed networks that can be clustered, for example, a peer to peer search model for particular social networks. Thus, rather than visiting a particular website to gain a biased perspective of content, an individual can employ a search engine that utilizes a customized model in accordance with preferences of the individual.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
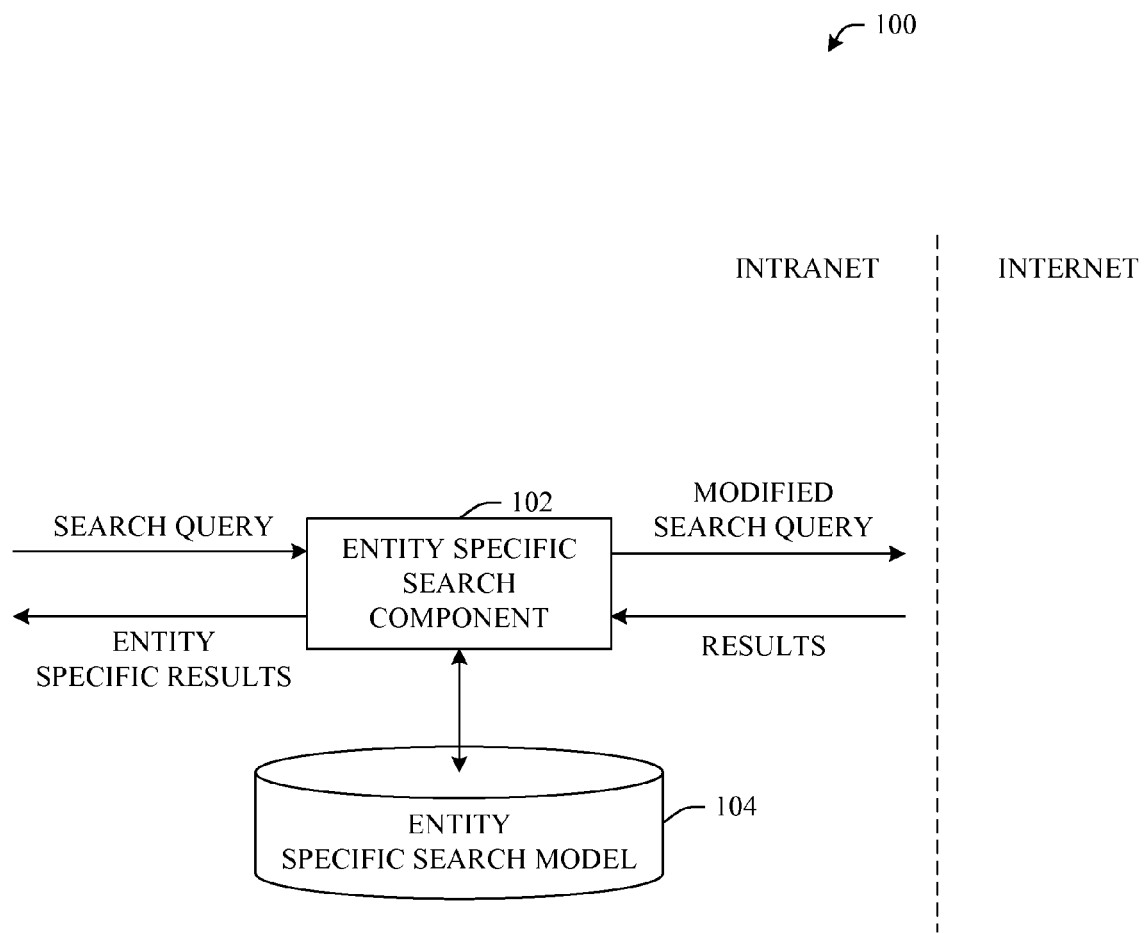
FIG. 1 illustrates a system that facilitates utilizing a model to generate search results in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in construction of new events or actions from a set of observed events and/or stored event data, whether or not the events are correlated in close temporal proximity, and whether the events and data come from one or several event and data sources.

FIG. 1 illustrates a system 100 that facilitates computer searching based upon a model trained in accordance with an entity. While many of the examples and scenarios that follow are directed to an "entity" in a corporation or business sense, it is to be understood that an "entity" can refer to any single individual or group of individuals whether formal or informal. For example, in other aspects, the system 100 can be employed with respect to a mission the group is to accomplish, or address a particular task, objective or goal of the group. Use of such entity-specific model facilitates honing a search query in connection with goals, preferences, and intent of the entity.

Accordingly, the entity-specific model can augment, prune, modify, etc. a search query to increase probability of search results corresponding to desired content sought by an originator of the query. Moreover, the model can also be used to filter results in order to optimize delivery of content believed to be relevant to the search originator. The filtering can include re-ranking and presenting search results as well as pruning search results. Thus, the system 100 by use of the model enhances a search so as to converge on results with a higher probability of being relevant to an entity than conventional search systems.

In specific aspects, the system 100 can custom-tailor search (and other services) based upon core demographics of an entity (e.g., individual or groups of individuals). For instance, in one particular scenario, the search system 100 can behave differently (e.g., render different results) with respect to a search for "viruses" depending on the originator of the search. Specifically, in accordance with the innovation, it is to be understood that the system 100 will render different results if the originator is medical personnel versus a child searching for a book report on "viruses."

Effectively, the system 100 can employ model-based searching in combination with an individual user's context, preferences, etc. For example, user profiles and demographics (e.g., user preferences, age, gender, religion, ethnicity, education level, likes, dislikes, interests, occupation, political ideology, marital status, family size, children, etc. (or combinations thereof)) can likewise be employed in connection with the entity-related information to facilitate generating rich search queries and obtaining search results that are meaningful to a particular user, filtering and conveying results. In aspects, this profile and demographic criteria can be obtained directly from explicitly entered information. As well, in other aspects, attributes can be inferred using machine learning, reasoning and other modeling techniques.

Furthermore, the system 100 can aggregate such user information amongst a plurality of users in connection with providing relevant results to a group of individuals (e.g., engaged in a common activity, part of a multi-user collaboration, within a work environment, social network, news feeds). In an embodiment, the system 100 can generate a probability distribution over the age of a user by analyzing the user's search queries and activities over time. Other evidence can be considered in the analysis, such as indications of interest crossed with page content, time of day that particular searches are conducted, etc. Once an indication of the probability distribution over demographics and other properties is established, the search (and/or services) can be custom-tailored accordingly.

As shown, generally, system 100 can include an entity-specific search component 102 and an entity-specific search model component 104. Effectively, the entity specific search model 104 can be established or trained based upon any criteria, context and/or preference associated with the entity as a whole and/or with respect to individuals within the entity. The model 104 can be used to establish targeted and/or meaningful results to a search query.

Internet as well as intranet searching has become increasingly more common within corporations as an every day tool used by many employees. By way of example, employees commonly use these search resources to obtain information such as contact information, product information, competitor information, current event information, and the like. To this end, desktop as well as mobile-based computer-searching continues to evolve into an invaluable resource tool in day-to-day activities. However, with conventional systems, it is not uncommon to retrieve redundant and even useless information as a result of a search query.

Accordingly, an aspect of the innovation employs the entity-specific search model 104 to modify a search query in accordance with an entity's goal, mission, objective, task or purpose. As used herein, the term "goal" is used to describe substantially any mission, objective, task, project, purpose, preference, forecast, desire, etc. Thus, a search can be dynamically modified to return particularly relevant results in accordance with an entity's goal. In one example, the entity-specific search model 104 can be trained with entity-related data obtained via data mining operations upon the entity's intranet, servers and data stores. As well, user (e.g., employee) role description and other context data can be used in order to train the entity-specific search model 104 thereby additionally tailoring search results to produce particularly meaningful results.

By way of example, a user context can be established through use of information associated with a user's state. This information can be obtained from a variety of sources such as, for example, a global positioning system (GPS), state of concurrently running applications, time of day, personal information manager (PIM) data, visual monitors (e.g., cameras), audio detectors (e.g., microphones), accelerometers, devices/vehicles/machines being employed, device collaboration, service providers, pattern recognition (e.g., detect frowns, smiles . . . ), voice analysis (e.g., detect stress in individual's voice), analysis of background noise (e.g., detect traffic noise in background, sound of the ocean, restaurant environment . . . ), wireless triangulation with cell phone (e.g., in light of GPS shadows), gaze detectors, credit card transactions or the like, location analysis (e.g., just walked into mall), medical-related devices (pace-maker, glucose monitor, hearing aid, prosthetics with built-in circuitry), personal data assistants (PDAs), metadata, tags, etc.

In operation, the entity-specific search component 102 can receive a search query from a user, application, etc. In turn, the entity-specific search model 104 can be used in order to modify the search query in accordance with a defined (explicit or implicit) or inferred goal. In other words, the innovation provides for a customized search model 104 that focuses a computer-based search operation in connection with achieving information that is meaningful with respect to a goal(s) of the entity.

It will be understood upon review of the figures that follow, particular sources of information can be weighted more heavily by the model. In other words, upon gathering the entity-related information, the system 100 can weight specific data more heavily depending on any number factors including, but not limited to, the source, content, date, etc. of the data. For example, the system 100 can obtain entity-related data from a customer relation management (CRM) system (not shown) thereafter utilizing the information to train the model (104). It will be appreciated that the system can dynamically train the model based upon changes in the information as well as other contextual factors. As such, effectively, the system can continually learn and adapt over time thereby producing particularly increasingly meaningful search results. The training can likewise be performed explicitly as well as implicitly, with user feedback for example. Moreover, a seed version of the model 104 can be shipped with a product, and thereafter adapt through training to provide for personalization in accordance with or more users. Versions of the seed model can vary as a function of target audiences, demographics, preferences, etc. Accordingly, such seed models can be trained a priori as a function of target users.

It is to be appreciated that the system 100 can employ a utility-based analysis in connection with modifying queries as well as filtering results. More particularly, a cost-benefit analysis can be employed where the cost of making an incorrect modification to a query is factored against the potential benefit to the user of the modification. Likewise, the cost of incorrectly filtering a subset of search results versus the benefit of streamlining the search results can be employed in connection with the system. The utility-based analysis can for example be a probabilistic-based analysis, or statistical-based analysis.

In still other aspects, the entity specific search component 102 can in some sense "live" anywhere in a system architecture or even in time. By way of example, in an extreme case, one can imagine a "pre-trained" entity specific system 100 residing at a specific URL (uniform resource locator), for example, http://www.boatloverssearch.com. In this scenario, the entity can be described as a class of people who like boats. More particularly, in another example, the entity specific portions may be components that understand chemistry and queries most often performed by chemistry students. Accordingly, these components could reside anywhere on a network and be called via standard web protocols.

In the scenarios above, the entity specific components can be recursive in nature, or more specifically, can be composable. For instance, one may have a fairly broad set of entity specific capabilities related to college students, whereby a specialized one can be additionally invoked for chemistry students at college.

If these engines are composable, it is to be understood that they can also be combinable. For example, there can be scenarios where multiple forms of entity specific searches are run. Subsequently, a combiner engine can take all of that input into consideration to form a final judgment or output. By analogy, this entity-specific search component 102 can be thought of as an 'expert'. Thus, effectively a user can consult with a variety of different 'experts', balance their opinions together, and form a final decision thereafter.

Figure 2:
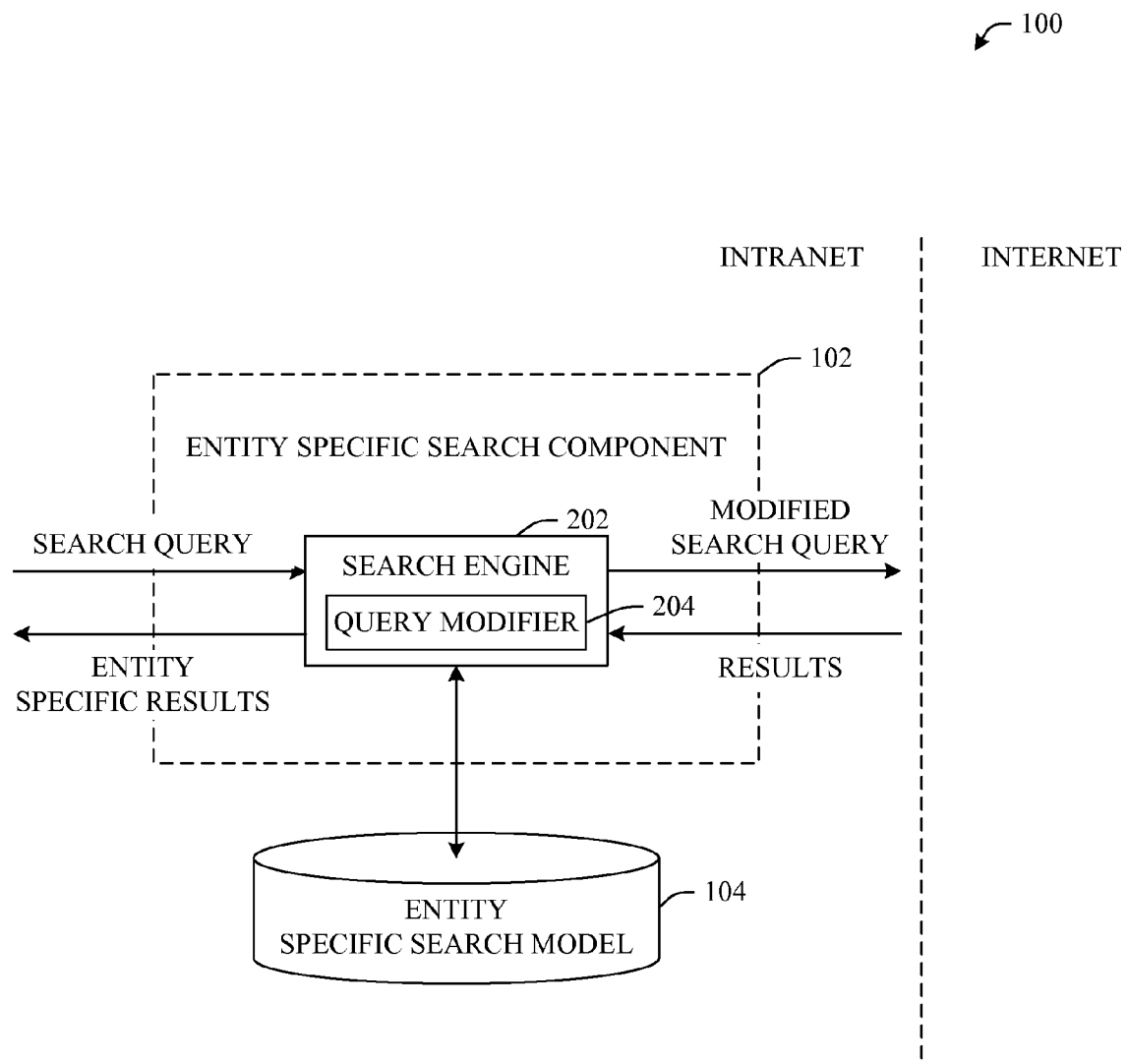
FIG. 2 illustrates an exemplary system that utilizes a search component and a query modifier to generate search results in accordance with a model.

Turning now to FIG. 2, an alternative block diagram of system 100 in accordance with an aspect of the novel subject matter is shown. More particularly, the entity-specific search component 102 can include a search engine component 202 having a query modifier component 204 therein. As described supra, a search query can be received by the search engine component 202 whereby the query modifier component 204 can employ the search model 104 to modify the query in accordance with the model. Additionally, it will be understood upon review of the figures that follow, a search model generator component can be provided to generate and/or train the model in accordance with a current or future goal of an entity.

In operation, search queries can be formulated and/or modified transparently by the model 104 to facilitate achieving optimal and meaningful search results. As well, the model 104 can be employed to push information (e.g., advertisements) along with search results with respect to the goal. In accordance with this model 104, certain content can be filtered from the retained search results prior to display to a user. Similarly, results can be sorted, ranked, etc. as desired. Each of these configuration operations will be described in greater detail infra.

The scenario that follows is provided to add perspective to usefulness and novel functionality of the innovation. As such, the following scenario(s) is not intended to limit the innovation in any manner. Rather, it will be understood that countless examples that use the novel features of the innovation exist. Each of these examples is to be included within the scope of this disclosure and claims appended hereto.

In a first scenario, the system 100 can enable an entity (e.g., corporation) to generate revenue by selling advertising space within an in-house corporate network. For instance, the entity can gain additional revenue by extracting a share in advertisement revenue from the merchants that have been provided privileged access to the corporate network. As well, preferred rankings of content based upon search and/or display can be provided as a revenue generating mechanism. In this example, the model 104 can be trained with specific advertising data. Thus, when a search query is executed, the model 104 can be used to modify the search query to effectively push relevant advertisements to the user. In doing so, the model 104 will effectively provide a targeted advertising campaign that both helps the advertiser to reach a specific target audience as well as reduce amount of useless information received by a searcher.

In addition to analyzing content of the search query in order to render advertisements and content, the system 100 can also consider context-based factors related to the search in determining relevant information to render. By way of example, context factors such as, time of day, location, state of mind, etc. can be employed to further streamline search queries thereafter rendering useful information to a user.

It is to be appreciated that the system 100 can be part of a client-based system as well as a host. For example, a model can reside on a desktop computer of a user and modify search results in accordance with goals, intent, preferences, etc. of the user or his/her employer. The system 100 can also reside on a server of an intranet and modify searches and search results. Likewise, as discussed below, external search engines can also provide customized models to entities. Moreover, the system 100 can be integrated into numerous devices such as for example, cellular telephones, personal data assistants (PDAs), televisions, vehicles, boats, airplanes, GPS devices, laptop computers, etc., and the system 100 employ context of the device (e.g., speed, location, time of day, ambient conditions) to further modify searches or filter search results.

In accordance with the system 100 of FIG. 2, an entity can effectively control results of search queries by training the model accordingly. As described above, the model 104 can be applied to any cluster of individuals where customized classification, content provisioning, filtering, etc. is desired whether or not as part of an entity goal and/or preference among a set of like individuals.

Additionally, the novel functionality of the model 104 can be applied to distributed networks as well that can be clustered, for example, a peer to peer search model for particular social networks. Thus, rather than going to a particular website for a biased perspective of content, an individual (e.g., entity) can utilize a search engine 202 that employs a customized model 104 in accordance with preferences of the individual or group.

Through the novel aspects of the innovation, an entity (e.g., corporate entity) can have greater control of outgoing and incoming data. Query formulation can be improved by using the model 104 to converge toward a goal(s) of an entity (e.g., group, corporate entity). As will be described below with reference to gathering training data, unique classifications can be employed to facilitate aggregating data and understanding the entity. Additionally, the innovation can facilitate searching in connection with software products, where the search can be tied to use of such software within corporate framework.

Figure 3:
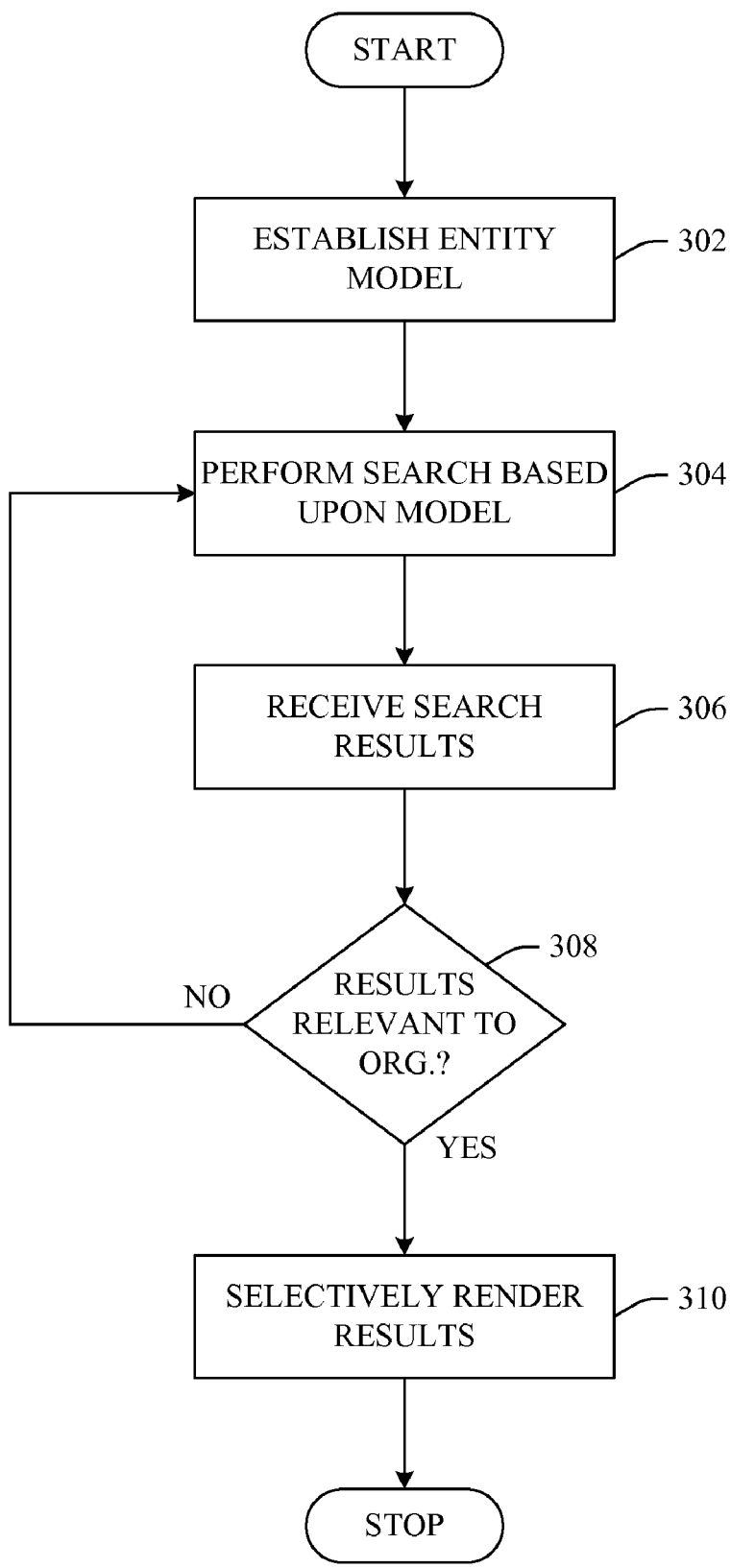
FIG. 3 illustrates an exemplary flow chart of procedures that facilitate establishing a model and locating search results based upon the model in accordance with an aspect of the innovation.

FIG. 3 illustrates a methodology of employing a model in connection with a computer-based search in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, it is to be appreciated that a methodology can alternatively be represented as a series of interrelated states or events, such as in a state diagram. Moreover, not all illustrated acts may be required to implement a methodology in accordance with the innovation.

At 302, an entity model is established in accordance with a goal. As described above, the goal can be related to an individual, a group of individuals or an entity. The following examples are provided to add perspective to the innovation. In one example, the model can trained with politically biased data such that results returned can reflect overall political views of the entity or the searcher. In another example, the entity can sell advertising space on a local intranet such that the advertiser can train the model in order to promote desired products, views, or the like.

The model can be trained based upon desired goals (e.g., objective, purpose, preference). By way of further example, and not limitation, as the goal changes, the model can also be retrained to reflect the modified goal. Effectively, the model can dynamically learn based upon continued use. Over time, results returned in accordance with the model will remain particularly accurate with respect to the status or state of a particular goal. The model 104 can also in a particular embodiment compare data with other like models and further modify performance thereof based on such comparison, for example, in order to mitigate operating in a vacuum.

A search query is modified in accordance with the model at 304. The model can be employed to establish or originate a model-based search query on behalf of the user. In this alternative aspect, the system can automatically identify search results on behalf of the user in accordance with the model. Continuing with the example from 304, at 306, search results are received in accordance with the modified search query.

A determination is made at 308 if the results are relevant to the entity. If not relevant, the methodology returns to 304 to refine the search query in an effort to retain relevant search results. If the results are deemed relevant, the results can be selectively rendered at 310. In one aspect, a subset of the results can be filtered from the returned set of results based upon the model. This selective filtering can enable an entity, advertiser or other individual to further streamline results in an attempt to reach a target audience.

In the entity scenario, this selective rendering can enable returning results that are meaningful to the entity. In the advertiser scenario, this selective rendering can enable an advertiser to promote a product/service, viewpoint, belief, etc. In each case, novel use of the model together with or separate from selective rendering mechanisms of the innovation can facilitate targeting, streamlining and pinpointing search results to a user.

Figure 4:
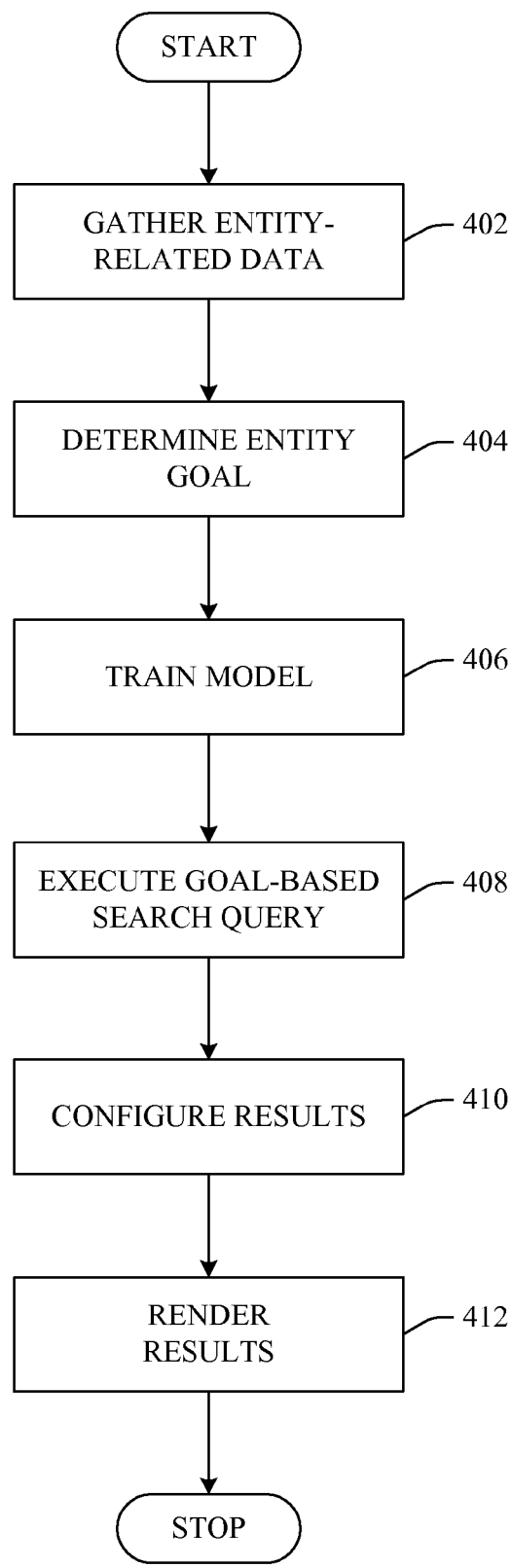
FIG. 4 illustrates an exemplary flow chart of procedures that facilitate gathering entity related information and training a model in accordance with an aspect of the innovation.

Referring now to FIG. 4, a methodology of automatically training a model in accordance with an aspect of the innovation is shown. In accordance with the methodology, at 402, entity-related data can be gathered. In disparate aspects, the information can be gathered via a mining operation, inquiry, etc. In other words, relevant entity-related data can be discovered by mining entity data or by user input. Other aspects can infer relevant entity-related data based upon historical and/or statistical patterns.

Once information is gathered, a goal of the entity can be determined at 404. This goal can be determined by analyzing the gathered entity-related data or by making an inference(s) based upon the gathered data. In still another aspect, the goal or set of goals can be directly identified by a user or other application. In any case, at 406, a model can be trained based upon the goal in view of the entity-related data.

A goal-based search query can be executed at 408 thereafter returning results based upon the model. It is to be appreciated that this goal-based search query can be formulated and/or modified transparent to user by the model to facilitate achieving optimal results. At 410, the results can be configured as desired. For example, the results can be sorted, ranked, filtered, etc. based upon a user preference or context. Similarly, the results can be configured based upon a device context. By way of example, results can ultimately be filtered, ranked, organized, etc. differently if the rendering device is a desktop personal computer verses a mobile device having a smaller viewing screen. More particularly, in one aspect, the information itself can be analyzed and less relevant information removed, for example, to maximize utilization of limited screen real estate and/or device capabilities.

Once configured, the results can be rendered at 412, thereafter, a stop block is reached. Given the user context/state, the results can be conveyed (e.g., rendered) in an optimal manner (e.g., conveyed as text, graphics, audio, or combination thereof) so as to provide the user with information in a convenient, glanceable and/or non-obtrusive manner. For example, if the user is a driving a car, search results could be conveyed as audio, but when motion of the vehicle is no longer detected, the information can optionally be conveyed in a visual manner.

Figure 5:
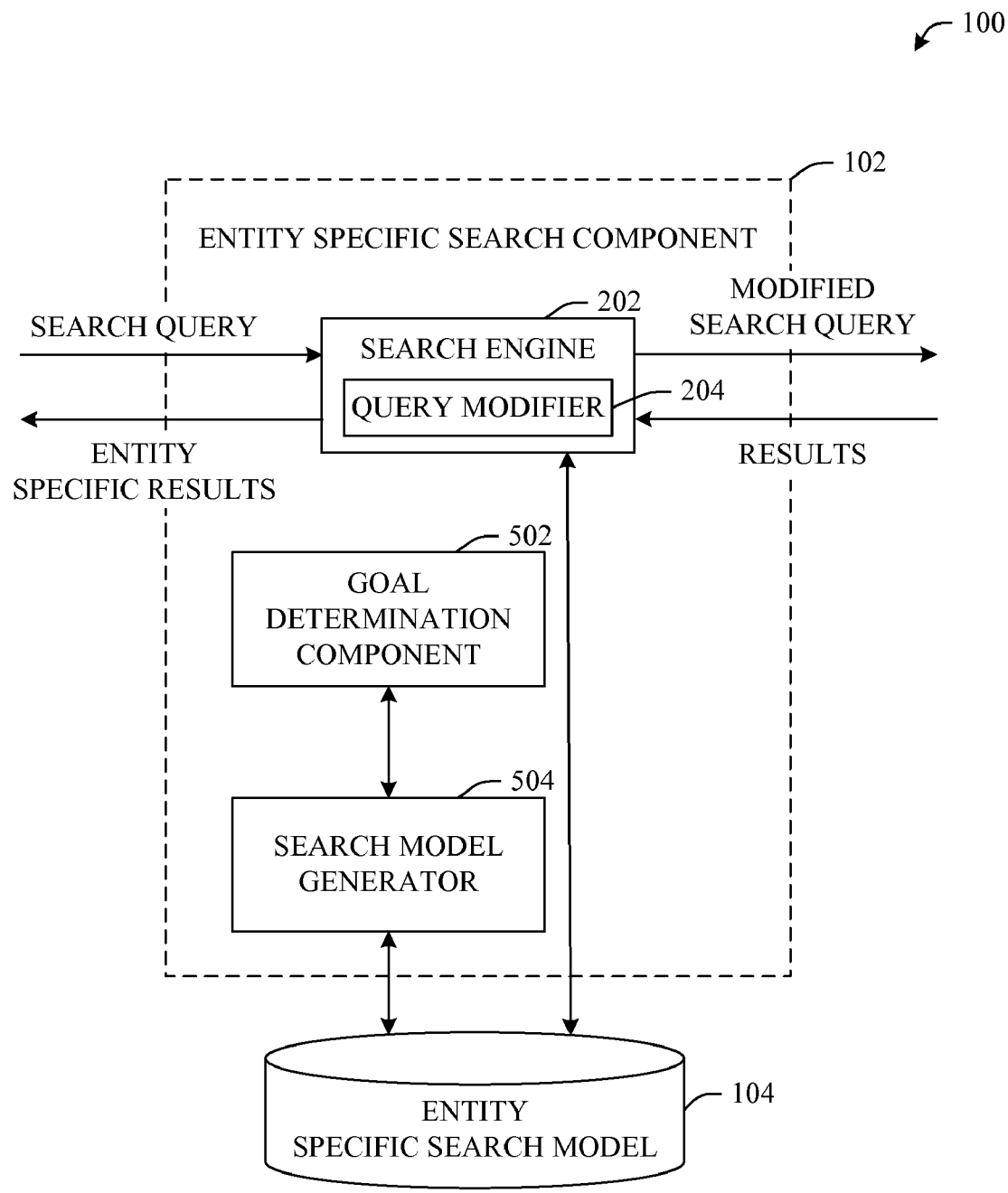
FIG. 5 illustrates a system that includes a goal determination component and a search model generator in accordance with an aspect of the innovation.

Turning now to FIG. 5, an alternative block diagram of system 100 is shown. More particularly, the diagram of FIG. 5 illustrates an entity-specific search component 102 having a goal determination component 502 and a search model generator 504 included therein. Although these components (502, 504) are illustrated inclusive of the entity-specific search component 102, it is to be understood that, in other aspects, these components (502, 504) can be located remotely from the entity-specific search component 102. As well, although two disparate sub-components (502, 504) are shown, it will be understood that the novel functionality can be incorporated into a single component without departing from the scope of the innovation described herein.

In operation, the goal determination component 502 can be employed to establish a particular goal (or set of goals) related to the entity. As described above, this goal determination component 502 can be employed to gather entity-related information and to utilize the gathered information to establish a goal. All in all, the system 100 can retrieve entity-related information and data from a variety of sources and automatically establish (e.g., infer, calculate) a goal based upon the retrieved data. This information gathering process will be better understood upon a review of FIG. 6 that follows. Of course, in other aspects, the goal can be directly input or determined by a user or application.

Once the goal is established, the search model generator 504 can use the goal in view of the entity-related data to establish (e.g., train) a search model (e.g., 104). The model 104 can be used to transparently generate and/or modify search queries via the query modifier 204. As such, the search engine 202 can return particularly meaningful results based upon the trained model.

It is another novel feature of the innovation to continually monitor the goal thereby adjusting the model in accordance with changes in the goal and/or changes in entity-related data. For example, as the goal shifts focus, this shift can be automatically detected by the goal determination component 502 thereby prompting modification of the model. Thus, future search queries can be modified to reflect the change in the entity's goal(s).

Figure 6:
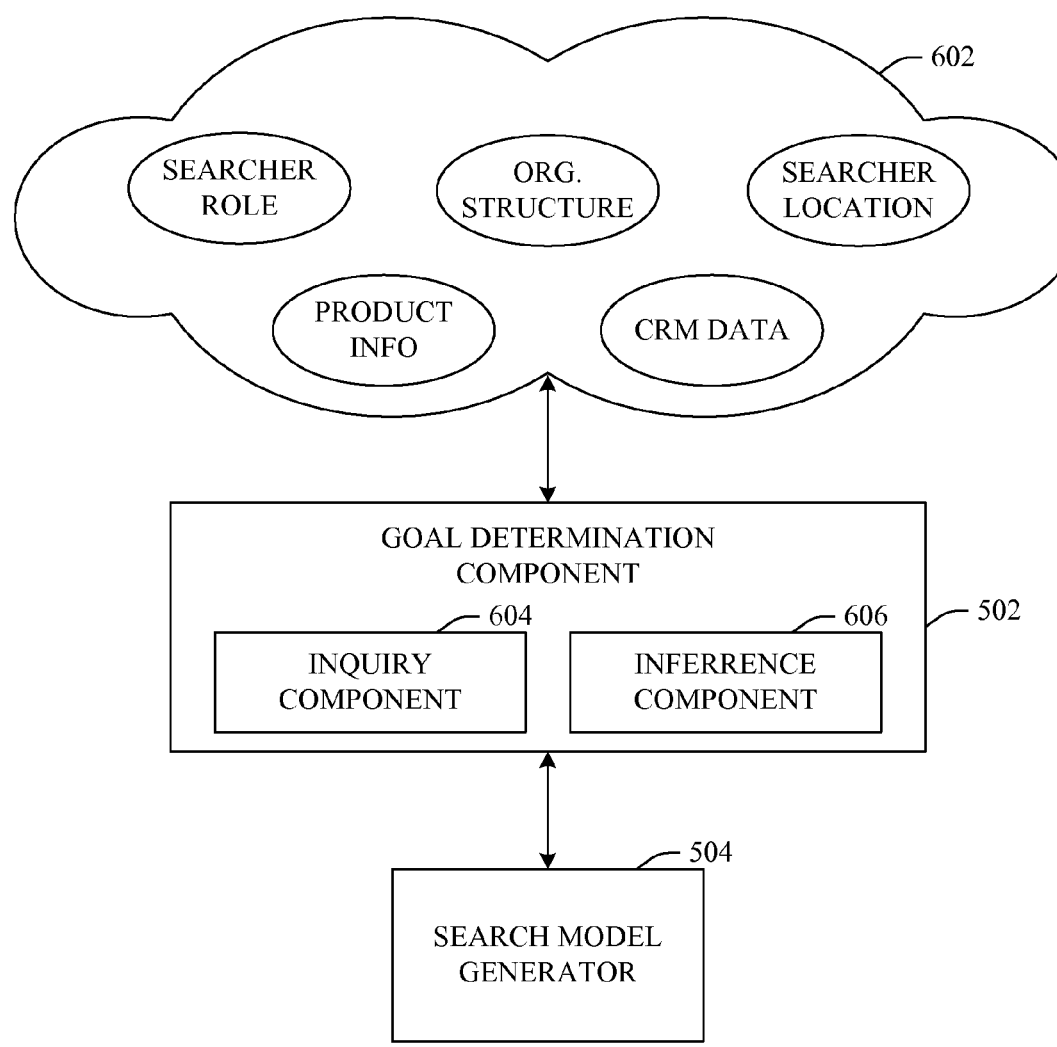
FIG. 6 illustrates a block diagram of a goal determination component that accesses entity-related information in order to establish a goal in accordance with an aspect of the innovation.

FIG. 6 illustrates the novel functionality of the goal determination component 502 in accordance with an aspect of the innovation. As shown, goal determination component 502 can automatically retrieve entity-related information 602 by which the search model generator can establish and/or train the model. Although specific data sources are shown as sub-sources of the entity-related information 602, it is to be understood and appreciated that additional information can be input, gathered, inferred, etc. and considered by the goal determination component 502 to generate (or modify) a relevant goal.

With continued reference to FIG. 6, the entity-related information 602 can include, but is not limited to, the searcher's role, the entity structure, the searcher's location, product information, customer relations management (CRM) data, etc. In addition to the goal determination component 502 gathering entity-related information 602, the component 502 can further include an inquiry component 604 and/or an inference component 606.

The inquiry component 604 can be employed to query a user for additional entity-related information that can be used by the search model generator 504 to establish the model (not shown). In another aspect, the goal can be affirmatively set by the entity or user. Furthermore, the goal determination component 502 can include an inference component 606 that can infer the goal based at least in part upon the gathered entity-related information 602.

The novel goal determination component 502 can be employed to establish or infer a goal of an entity by analyzing entity-related data 602. As well, the goal determination component 502 can dynamically monitor and revise the goal based at least in part upon changes in entity-related information as well as the state related to the goal. Moreover, the goal determination component 502 can consider other factors including but, not limited to, user context, entity context, device context or the like. Accordingly, all of the aforementioned information can be employed by the search model generator 504 in order to generate the model as described in FIGS. 1 and 2.

Figure 7:
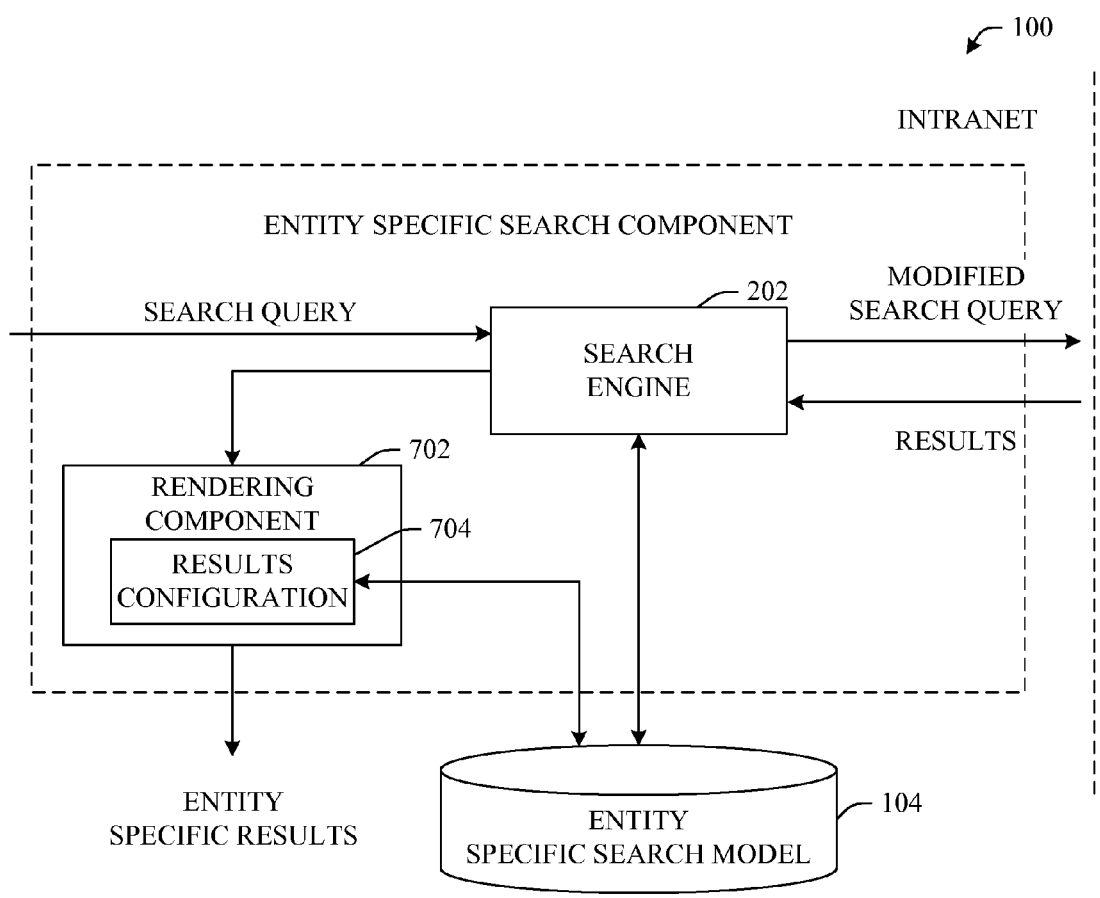
FIG. 7 illustrates a block diagram of a system that employs a rendering component and a results configuration component to organize search results in accordance with an aspect of the innovation.

Referring now to FIG. 7, an alternative architectural diagram of system 100 is shown. More particularly, in addition to dynamically modifying a user query in order to return meaningful search results in view of a goal, the system 100 can employ a rendering component 702 to control the delivery of search results. As shown, the rendering component 702 can include a results configuration component 704 capable of organizing the results prior to display or transfer. Moreover, the results configuration component 704 can organize (and/or filter) results in accordance with the model.

Figure 8:
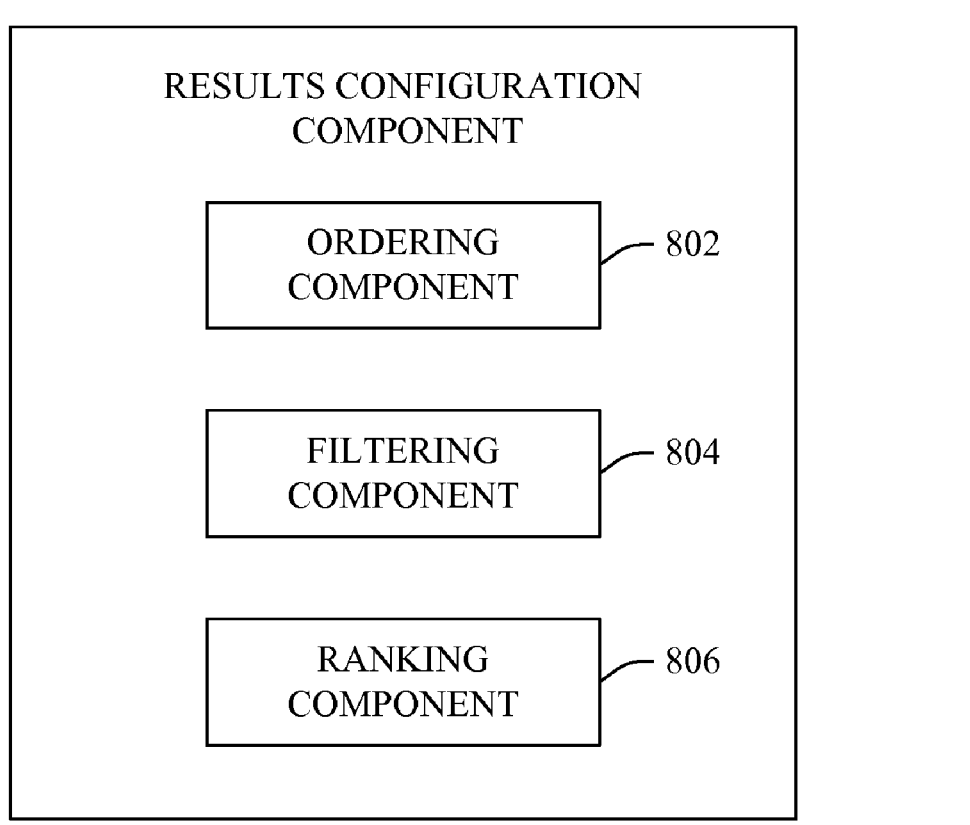
FIG. 8 illustrates a block diagram of a results configuration component that includes an ordering component, a filtering component and a ranking component in accordance with an aspect of the innovation.

FIG. 8 illustrates a block diagram of an exemplary results configuration component 704 in accordance with an aspect of the innovation. As shown, the results configuration component 704 can include an ordering component 802, a filtering component 804 and a ranking component 806. Each of these components (802, 804, 806) can act independently (e.g., based upon a predefined rule or inference) or in conjunction with the trained model.

Referring first to the ordering component 802, this component can arrange the results in any order (e.g., relevance, alphabetical, numerical, etc.). The filtering component 804 can be employed to sort search results. For example, the results can be sorted into a lesser number of results thereby increasing the relevance of the results. This sorting can be based upon any desired criteria including, but not limited to, relevance, reliability, source, author, etc. As well, the results can be sorted based upon characteristics of a receiving device. For example, the results can be sorted differently if they are to be rendered via a personal computer with a full size monitor as opposed to a mobile device such as a mobile phone or personal data assistant (PDA).

Finally, a ranking component 806 can be employed to grade or categorize the search results in accordance with any desired criteria. For example, the search results can be ranked based upon relevance, creation date, authenticity, etc. All in all, once the results are configured, all or a subset of the results can be rendered, for example, to a user via a display device.

In accordance with aspects of the innovation, the system 100 can employ a machine learning and reasoning (MLR) component (not shown) which facilitates automating one or more features in accordance with the subject innovation. In this particular implementation, the MLR component can be positioned to interface to each of the search engine (202), the query modifier (204), the goal determination component 502, the search model generator 504, the rendering component 702 and/or the results configuration component 704. To this end, an MLR component can be employed to automate and/or infer an action in accordance with the novel functionality described herein.

The subject innovation (e.g., in connection with query generation/modification, model generation, results selection/configuration) can employ various MLR-based schemes for carrying out various aspects thereof. For example, a process for learning and reasoning about predicting which results are desired and how they should be rendered can be facilitated via an automatic classifier system and process. In another example, an MLR component can be employed to infer a goal or preference of a user and/or entity.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one example, the MLR component can learn, based on context information (e.g., time of day, week, location, user role) what types of results are desired and how the results should be rendered. For example, if a user routinely queries for specific information and subsequently selects the same or similar set of results from those rendered, over time, the MLR component can learn this pattern of usage. Thus, the system can reason (or predict) that there is a high likelihood that the user will again select the same results upon executing the same or a similar search query. Accordingly, a statistical model can be generated with this information and for the purpose of, upon execution of the query, rendering a specific set of results in a desired manner.

Figure 9:
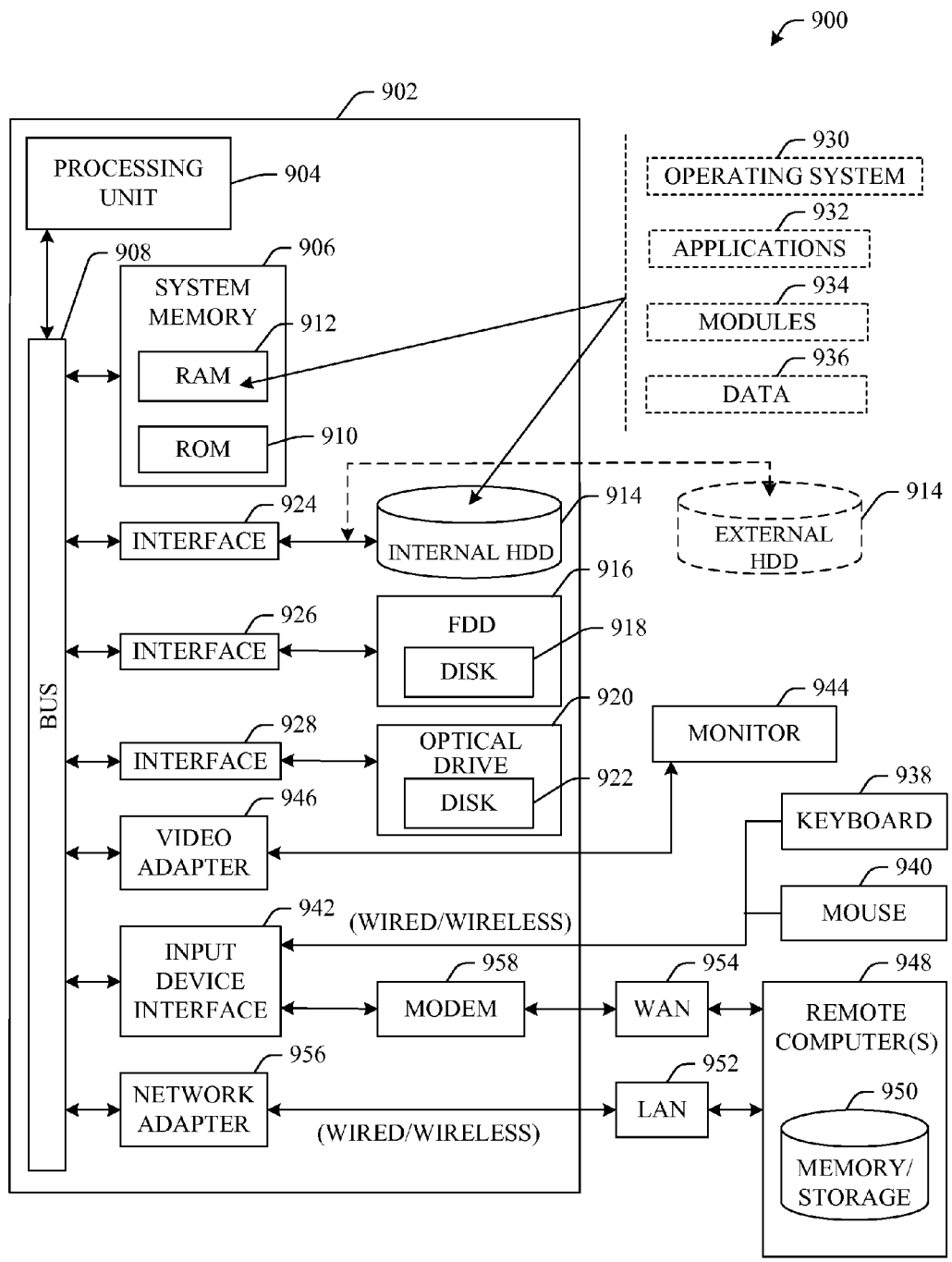
FIG. 9 illustrates a block diagram of a computer operable to execute the disclosed architecture.

Referring now to FIG. 9, there is illustrated a block diagram of a computer operable to execute the disclosed architecture of obtaining and rendering results with respect to a computer search based upon an entity-specific model. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
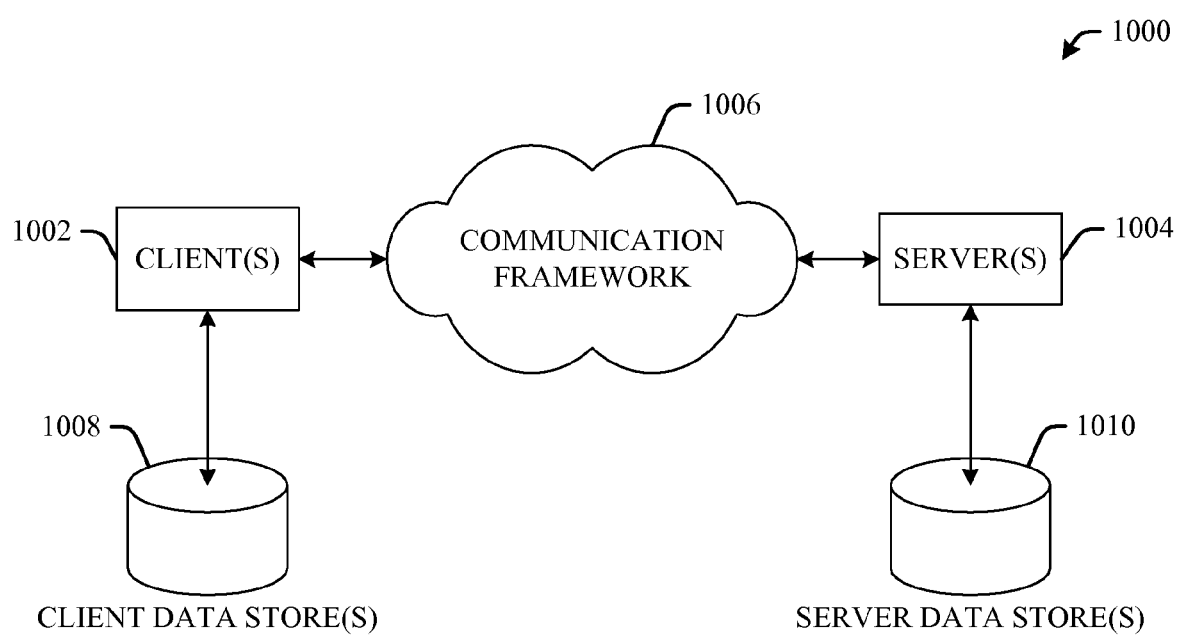
FIG. 10 illustrates a schematic block diagram of an exemplary computing environment in accordance with the subject innovation.

Referring now to FIG. 10, there is illustrated a schematic block diagram of an exemplary computing environment 1000 that facilitates model-based computer searching and rendering of results in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that customizes computer-based search related to an entity, comprising a memory having stored therein computer executable components and at least one processor that executes the following computer executable components:
   a goal determination component that gathers data associated with the entity, the data corresponding to a goal of the entity, a mission of the entity, or a purpose of the entity, wherein the entity comprises a group of individuals, and wherein the data associated with the entity corresponds to least the group of individuals;
   a search model that is trained with the data associated with the entity;
   a query modification component that employs the search model to modify a search query into a modified search query as a function of the data associated with the entity, the query modification component configured to modify the search query into the modified search query transparent to a user inputting the search query;
   a search engine that receives the search query from an individual in the entity, communicates the search query to the query modification component, receives the modified search query from the query modification component, retrieves entity-based search results in accordance with the modified search query, and provides the entity-based search results to the individual in the entity;
   a rendering component that uses the trained search model to re-rank the entity-based search results prior to display to the user;
   a results configuration component that organizes a subset of the entity-based search results; and
   wherein the rendering component performs a utility-based analysis in connection with displaying the subset of the entity-based search results to the user, wherein the utility-based analysis factors a probability of cost of displaying a result to the user versus a probability of benefit of displaying the result to the user.

2. The system of claim 1, wherein the data associated with the entity is demographic data that corresponds to at least one individual of the group of individuals, wherein the demographic data comprises at least one of the following related to the at least one individual: age, gender, religion, ethnicity, education level, likes, dislikes, interests, occupation, political ideology, marital status, family size, or children.

3. The computer-implemented system of claim 1, wherein the search model is trained with data mined from a subset of the group of individuals.

4. The computer-implemented system of claim 1, wherein the entity-specific search component further comprises a search model generator that establishes the search model based on, at least in part, the data associated with the entity.

5. The computer-implemented system of claim 4, wherein the goal determination component inputs the gathered data associated with the entity into the search model generator.

6. The computer-implemented system of claim 5, wherein the goal determination component comprises at least one of:
   an inquiry component that queries a user to identify the mission, objective, task, and purpose of the entity; and
   an inference component that infers the mission, objective, task, and purpose of the entity based on, at least in part, the data associated with the entity.

7. The computer-implemented system of claim 6, wherein the data associated with the entity includes at least one of a role of the user within the entity, an entity structure, a search location of the user, entity product information, or customer relation management (CRM) system data associated with the entity.

8. The computer-implemented system of claim 1, wherein the entity-specific search component modifies the search query as a function of an inferred goal and state of an individual of the group of individuals.

9. A computer-implemented method of performing an entity-based computer search, wherein the method is performed by a processor that executes at least the following acts:
   gathering data associated with an entity, the data corresponding to a goal of the entity, a mission of the entity, or a purpose of the entity, wherein the entity comprises a group of individuals, and wherein the data associated with the entity corresponds to least the group of individuals;
   training a search model with the data associated with the entity;
   receiving a search query from an individual in the entity;
   employing the search model to modify the search query into a modified search query as a function of the data associated with the entity, wherein the search query being modified into the modified search query is transparent to a user inputting the search query;
   retrieving entity-based search results in accordance with the modified search query;
   providing the entity-based search results to the individual in the entity;
   re-ranking the entity-based search results uses the trained search model prior to display to the user;
   organizing a subset of the entity-based search results; and
   performing a utility-based analysis in connection with displaying the subset of the entity-based search results to the user, wherein the utility-based analysis factors a probability of cost of displaying a result to the user versus a probability of benefit of displaying the result to the user.

10. The method of claim 9, further comprising:
establishing an entity context; and
modifying the entity-based search query based on, at least in part, the entity context, wherein the entity context includes a role of a searching member of the entity, structure of the entity, a location of the searching member of the entity, product information associated with the entity, and customer relations management (CRM) data associated with the entity.

11. The method of claim 9, further comprising:
at least one of explicitly or implicitly training the model based upon entity feedback.

12. The method of claim 11, further comprising automatically gathering data associated with the entity based on, at least in part, an objective, goal, mission, task, or purpose of the entity.

13. The method of claim 12, further comprising automatically gathering the data associated with the entity from a plurality of sources.

14. The method of claim 11, further comprising:
configuring a subset of the plurality of search results; and
rendering the subset of the plurality of search results.

15. A computer-implemented search system that comprises a memory having stored therein computer executable components and at least one processor that executes the following computer executable components:
means for gathering data associated with an entity, the data corresponding to a goal of the entity, a mission of the entity, or a purpose of the entity, wherein the entity comprises a group of individuals, and wherein the data associated with the entity corresponds to least the group of individuals;
means for training a search model with the data associated with the entity;
means for receiving a search query from an individual in the entity;
means for employing the search model to modify the search query into a modified search query as a function of the data associated with the entity, wherein the search query being modified into the modified search query is transparent to a user inputting the search query;
means for retrieving entity-based search results in accordance with the modified search query;
means for providing the entity-based search results to the individual in the entity;
means for re-ranking the entity-based search results uses the trained search model prior to display to the user;
means for organizing a subset of the entity-based search results; and
means for performing a utility-based analysis in connection with displaying the subset of the entity-based search results to the user, wherein the utility-based analysis factors a probability of cost of displaying a result to the user versus a probability of benefit of displaying the result to the user.

16. The computer-implemented system of claim 15, further comprising means for training the model based on, at least in part, a role of at least one of the individuals associated with the entity.

* * * * *